(12) United States Patent
Onishi et al.

(10) Patent No.: US 11,909,240 B2
(45) Date of Patent: Feb. 20, 2024

(54) CHARGING DEVICE

(71) Applicant: TOYOTA JIDOSHA KABUSHIKI KAISHA, Toyota (JP)

(72) Inventors: Yoichi Onishi, Okazaki (JP); Tetsuo Yamashita, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/840,777

(22) Filed: Jun. 15, 2022

(65) Prior Publication Data

US 2023/0031658 A1    Feb. 2, 2023

(30) Foreign Application Priority Data

Jul. 30, 2021   (JP) .................................. 2021-126099

(51) Int. Cl.
*H02J 7/00* (2006.01)
*B60L 53/51* (2019.01)
*B60L 53/16* (2019.01)

(52) U.S. Cl.
CPC ............ *H02J 7/0042* (2013.01); *B60L 53/16* (2019.02); *B60L 53/51* (2019.02); *H02J 7/00032* (2020.01); *H02J 2207/20* (2020.01); *H02J 2300/22* (2020.01)

(58) Field of Classification Search
CPC .. H02J 7/0042; H02J 7/00032; H02J 2207/20; H02J 2300/22; H02J 7/342; H02J 7/35; H02J 2310/48; B60L 53/16; B60L 53/51; B60L 53/11; B60L 53/22; Y02T 10/70; Y02T 10/7072; Y02T 90/14
See application file for complete search history.

(56) References Cited

U.S. PATENT DOCUMENTS

2018/0037121 A1*  2/2018  Narla ........................ H02J 7/35
2021/0313870 A1  10/2021  Iwabuki et al.

FOREIGN PATENT DOCUMENTS

| JP | 2002-151161 A | 5/2002 |
| JP | 2020-537474 A | 12/2020 |
| WO | 2019/071359 A1 | 4/2019 |
| WO | 2020/049801 A | 4/2020 |

* cited by examiner

*Primary Examiner* — Lincoln D Donovan
*Assistant Examiner* — Alex W Lam
(74) *Attorney, Agent, or Firm* — Dinsmore & Shohl LLP

(57) ABSTRACT

A charging device disclosed herein includes an input port, an output port, and a relay circuit. The input port is electrically connected to an external power source provided externally and that is configured to be able to input direct-current power and alternating-current power from the external power source. The output port is electrically connected to an electrified vehicle and that outputs direct-current power to the electrified vehicle. The relay circuit relays electric power between the input port and the output port. The relay circuit includes a converter circuit that converts alternating-current power into direct-current power when the alternating-current power is input to the input port, and an input bypass circuit that causes direct-current power to bypass the converter circuit when the direct-current power is input to the input port.

14 Claims, 7 Drawing Sheets

CHARGING DEVICE

CROSS-REFERENCE TO RELATED APPLICATION

This application claims priority to Japanese Patent Application No. 2021-126099 filed on Jul. 30, 2021, incorporated herein by reference in its entirety.

BACKGROUND

1. Technical Field

The technique disclosed in the present specification relates to a charging device. In particular, the present disclosure relates to a charging device provided with an output port for outputting direct-current power to an electrified vehicle. The electrified vehicle in the present specification includes both a so-called battery electric vehicle having only a traveling motor without having an engine, and a so-called hybrid vehicle including both a traveling motor and an engine.

2. Description of Related Art

Japanese Unexamined Patent Application Publication No. 2002-151161 (JP 2002-151161 A) discloses a charging device. The alternating-current power is input to the charging device from a commercial alternating-current power source, for example, as represented by a household outlet. The charging device converts the input the alternating-current power into direct-current power by a rectifier circuit. As a result, the charging device outputs the direct-current power to a charging target.

SUMMARY

In recent years, the use of renewable energy such as solar power generation has been promoted due to consideration for the environment. By installing solar panels in each household, it is possible to cover the power consumption in a household by solar power generation. In solar power generation, direct-current power is output from the solar panel. The direct-current power output from the solar panel is converted to the alternating-current power by a power conditioner and supplied to indoor wiring in the household and an external power system. The electric power supplied to the indoor wiring can also be used for charging an electrified vehicle by using the charging device as described above. The fact that electrified vehicles are charged by renewable energy greatly contributes to the realization of a carbon-free society.

However, in the above mechanism, the direct-current power generated by solar power generation is converted into the alternating-current power by the power conditioner, then reconverted into the direct-current power by the charging device, and then supplied to the electrified vehicle. As described above, in the mode in which the power conversion is repeated, there is a problem that the energy efficiency is lowered due to the loss generated during the power conversion. In order to avoid this, it is conceivable to supply the direct-current power output from the solar panel to the electrified vehicle as it is without converting the direct-current power into the alternating-current power. In this case, instead of the conventional charging device described above, a charging device that accepts the direct-current power and outputs the direct-current power may be prepared.

On the other hand, depending on the time of day such as at night, or depending on the weather such as snowfall, it is assumed that the solar power generation does not function sufficiently and the electrified vehicle cannot be charged. In this case, it is necessary to use the alternating-current power supplied from the power system, and for that purpose, it is necessary to prepare a charging device that accepts the alternating-current power and outputs the direct-current power. That is, to be prepared for the case in which the solar power generation can be used and the case in which the solar power generation cannot be used, two charging devices will be required and it takes time and effort to use them properly.

In view of the above circumstances, the present specification provides technologies that contribute to the realization of a carbon-free society regarding charging devices for electrified vehicles.

A charging device disclosed herein includes an input port, an output port, and a relay circuit. The input port is electrically connected to an external power source provided externally and that is configured to be able to input direct-current power and alternating-current power from the external power source. The output port is electrically connected to an electrified vehicle and that outputs direct-current power to the electrified vehicle. The relay circuit relays electric power between the input port and the output port. The relay circuit includes a converter circuit that converts alternating-current power into direct-current power when the alternating-current power is input to the input port, and an input bypass circuit that causes direct-current power to bypass the converter circuit when the direct-current power is input to the input port.

According to the configuration described above, the charging device can accept both the alternating-current power and the direct-current power at the input port and supply the direct-current power to the electrified vehicle at the output port regardless of the type of power that is input. As a result, a common charging device can be used regardless of whether the power source for charging the electrified vehicle is a direct-current power source or an alternating-current power source. It is not necessary to prepare multiple charging devices, and it is not necessary to use different charging devices in accordance with the power source. The widespread use of such charging devices will promote the use of renewable energy and contribute to the realization of a carbon-free society.

Details of the techniques disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
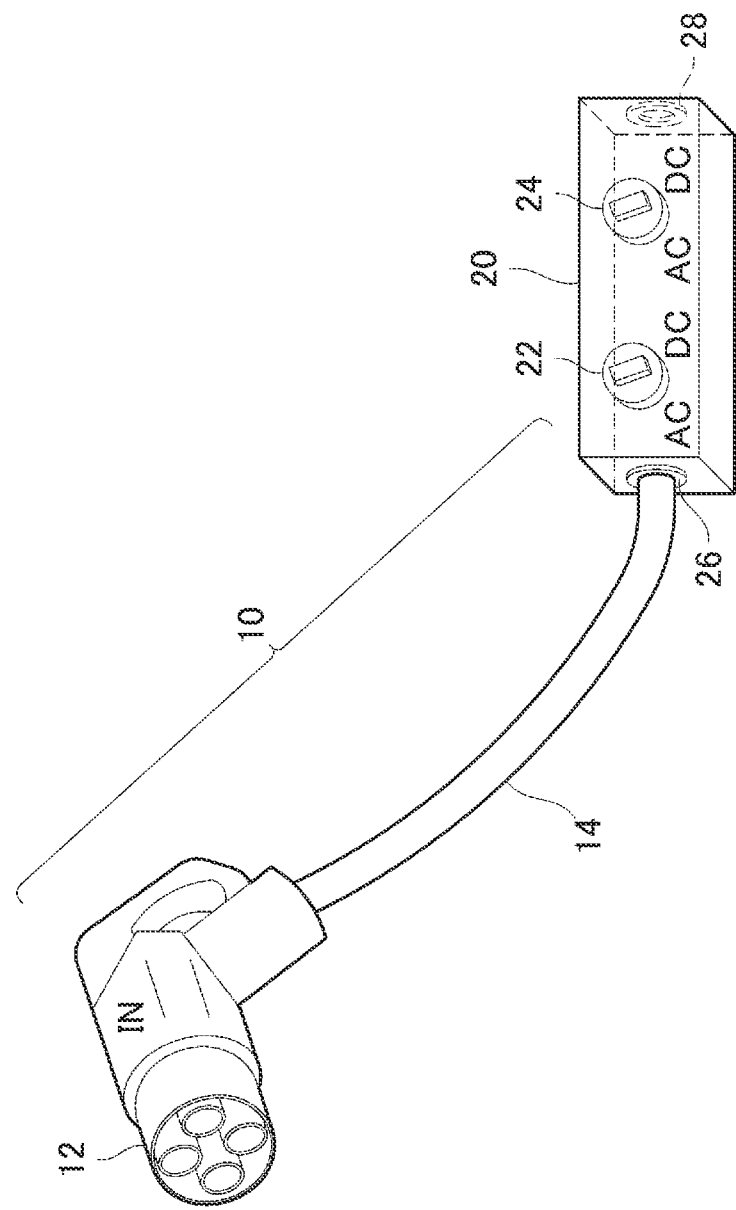
FIG. 1 shows a schematic diagram of a charging device 20 of an embodiment.

In one embodiment of the present technology, the relay circuit may further include a first input switch for switching between the converter circuit and the input bypass circuit. In that case, the first input switch may be configured to be switchable by a user. However, in another embodiment, for example, the converter circuit and the input bypass circuit may be switched depending on a time zone in which charging is executed.

In one embodiment of the present technology, the relay circuit may further include a second input switch for switching between the converter circuit and the input bypass circuit, and an input information receiving unit that receives, from the external power source, input information indicating whether power input from the external power source to the input port is direct-current power or alternating-current power. In that case, the second input switch may switch between the converter circuit and the input bypass circuit based on the input information received by the input information receiving unit. According to such a configuration, the converter circuit and the input bypass circuit can be reliably switched as compared with the configuration in which the user switches the converter circuit and the input bypass circuit, for example.

In one embodiment of the technique, the input port may be connected to a CHAdeMO (registered trademark) standard plug. According to such a configuration, the charging device can receive input information from an external power source with a relatively simple configuration.

In one embodiment of the present technology, the output port may be configured to be capable of outputting the alternating-current power to the electrified vehicle. In that case, the relay circuit may further include an inverter circuit that converts the direct-current power into the alternating-current power when outputting the alternating-current power to the electrified vehicle, and an output bypass circuit that causes direct-current power to bypass the inverter circuit when outputting the direct-current power to the electrified vehicle. In a small electrified vehicle, the battery capacity is small. When charging such a small electrified vehicle, it may be charged with the alternating-current power instead of the direct-current power. According to such a configuration, the relay circuit of the charging device outputs the alternating-current power to the small electrified vehicle via the inverter circuit when charging the small electrified vehicle. On the other hand, when charging a normal electrified vehicle, the relay circuit causes the direct-current power to bypass the inverter circuit and outputs the direct-current power to the electrified vehicle. As a result, the charging device can charge the small electrified vehicle while suppressing the increase in size.

In one embodiment of the present technology, the relay circuit may further include a first output switch that switches between the inverter circuit and the output bypass circuit. In that case, the first output switch may be configured to be switchable by the user. However, in another embodiment, for example, the inverter circuit and the input bypass circuit may be switched in accordance with the specifications of the cable connected to the output port.

In one embodiment of the present technology, the relay circuit may further include a second output switch that switches between the inverter circuit and the output bypass circuit, and an output information receiving unit that receives output information indicating whether power that is able to be output to the electrified vehicle is direct-current power or alternating-current power. In such a case, the second output switch may switch between the inverter circuit and the output bypass circuit based on the output information received by the output information receiving unit. According to such a configuration, the inverter circuit and the input bypass circuit can be reliably switched as compared with the configuration in which the user switches the converter circuit and the output bypass circuit, for example.

In one embodiment of the present technology, the input port may be configured to be removable from the external power source. In that case, the charging device may be configured to be portable. According to such a configuration, charging of an alternating-current electrified vehicle by a household outlet and charging of a direct-current electrified vehicle using one electrified vehicle as a power source can be performed by the same charging device.

In one embodiment of the present technology, an input plug may be connected to the input port, and an output plug may be connected to the output port. In that case, the charging device may have a feature for distinguishing between the input plug and the output plug. With such a configuration, the user can easily distinguish between the input plug connected to the external power source and the output plug connected to the electrified vehicle.

In one embodiment of the present technology, a housing for housing the relay circuit may be further provided. In that case, the input port and the output port may be provided on the same surface of the housing or on surfaces located on opposite sides of each other. According to such a configuration, by providing the input port and the output port on the same surface of the housing, the user can easily access both ports. Further, by providing the input port and the output port on the surfaces of the housing located on opposite sides of each other, both ports can be easily distinguished.

Embodiment

A charging device according to an embodiment will be described in detail below with reference to the drawings. As shown in FIG. 1, the charging device 20 is a portable charging device having a rectangular housing and that can be carried. By making the charging device 20 portable, it is possible to charge an electrified vehicle 6 in a house 30 described below and then transport the charging device 20 by the electrified vehicle 6. Thereby, the charging device 20 can charge the electrified vehicle 6 by using, for example, another house or an electrified vehicle different from the electrified vehicle 6 as an external power source.

The charging device 20 includes an input port 26, an output port 28, an input switch 22, and an output switch 24. The charging device 20 houses a relay circuit, which will be described later, inside the charging device 20.

An input cable 10 is detachably connected to the input port 26. Electric power is input to the input port 26 via the input cable 10 from an external power source as shown by the house 30 shown in FIG. 2, for example. The direct-current power may be input to the input port 26, or the alternating-current power may be input, depending on the external power source.

The input cable 10 includes an input plug 12 and an input cable main body 14. The input plug 12 is a CHAdeMO (registered trademark) standard plug and is connected to a socket of an external power source. The CHAdeMO standard is also used, for example, in cables for quick charging that connect to inlets of electrified vehicles.

Figure 2:
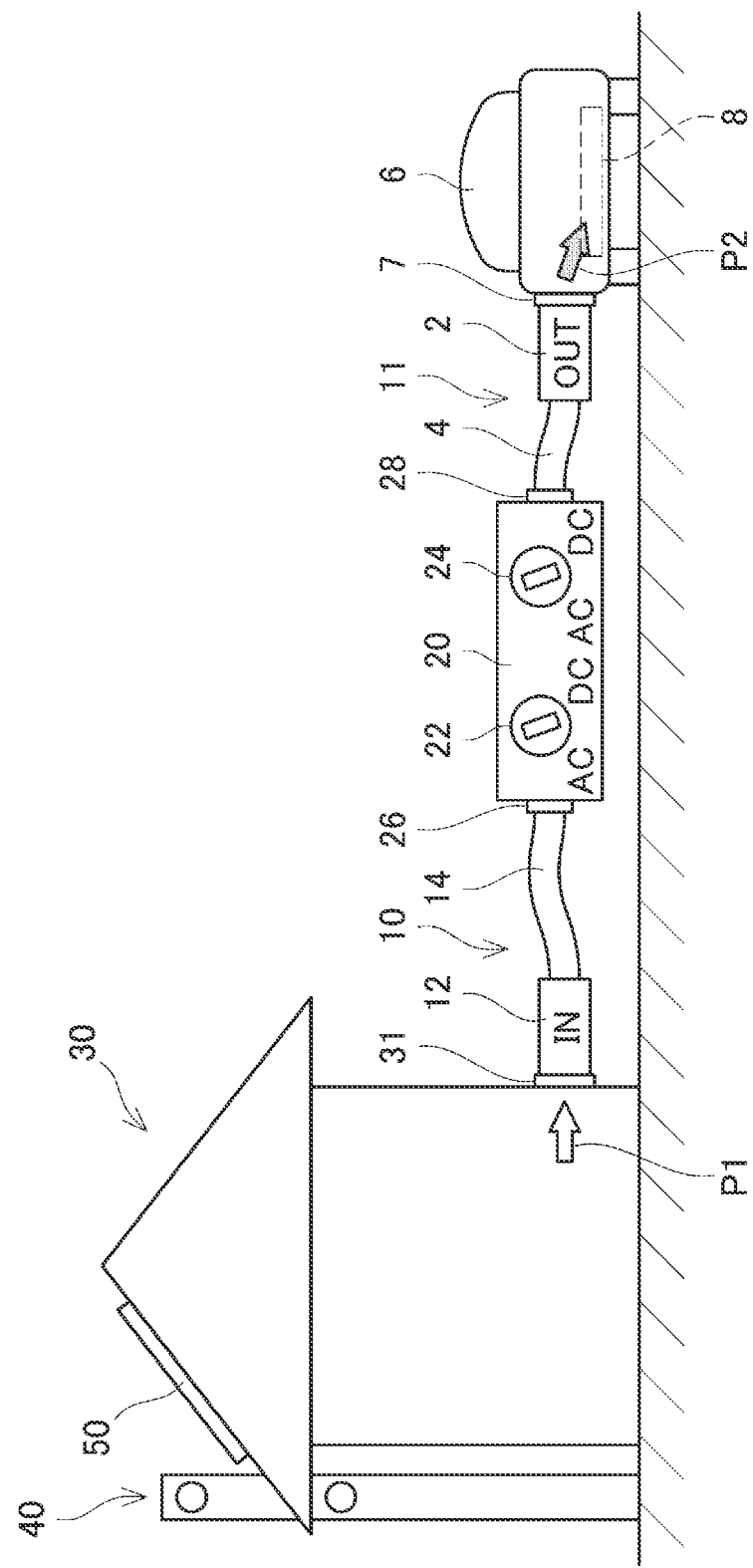
FIG. 2 shows a schematic diagram of the charging device 20 for charging an electrified vehicle 6.

As shown in FIG. 2, the charging device 20 is arranged between the house 30 that is an external power source and the electrified vehicle 6 that is a charging target. The input plug 12 of the input cable 10 is connected to an outlet 31 of the house 30. The input cable main body 14 of the input cable 10 is connected to the input port 26 of the charging device 20. As a result, an input power P1 is input to the charging device 20 from the house 30.

Similarly, the output port 28 is also connected to an inlet 7 of the electrified vehicle 6 via an output cable main body 4 of an output cable 11 and an output plug 2. As a result, an output power P2 is supplied to a battery 8 of the electrified vehicle 6. As a result, the battery 8 is charged by the output power P2. In this embodiment, the input cable 10 and the output cable 11 have the same structure. That is, the output plug 2 is also a CHAdeMO standard.

As shown in FIG. 2, the input plug 12 is marked with the letters "INT" indicating that it is connected to the outlet 31 (that is, the input side) of the house 30. On the other hand, the output plug 2 is marked with the letters "OUT" indicating that it is connected to the inlet 7 (that is, the output side) of the electrified vehicle 6. In this way, by marking each of the plugs 12 and 2 with letters for identifying the input side and the output side, the user can easily identify each of the plugs 12 and 2.

Further, the input port 26 is provided on one surface (left side of the paper in FIG. 2) of the housing of the charging device 20. The output port 28 is provided on the other side (right side of the paper in FIG. 2) of the housing of the charging device 20. That is, the surface on which the input port 26 of the housing is provided is located on the opposite side of the surface on which the output port 28 of the housing is provided. This allows the user to easily identify each of the ports 26, 28 as compared to the configuration in which each of the ports 26, 28 are adjacent to each other.

The input switch 22 is switched by the user in accordance with the type of the input power P1. For example, when the direct-current power is input to the charging device 20 from the house 30, the user turns the knob of the input switch 22 toward the direct-current side. FIG. 2 shows a state in which the knob of the input switch 22 is directed toward the direct-current side. On the other hand, when the alternating-current power is input to the charging device 20 from the house 30, the user turns the knob of the input switch 22 toward the alternating-current side. As a result, the charging device 20 can charge the electrified vehicle 6 regardless of whether the electric power input from the house 30 to the input port 26 is the alternating-current power or the direct-current power. The details of the structure of the input switch 22 will be described later with reference to FIGS. 4 to 7.

The output switch 24 is a switch that the user switches in accordance with the type of output power P2. The electrified vehicle 6 is charged by the direct-current power in a short time, which is called quick charging. However, for example, in a small electrified vehicle or the like, since the capacity of the battery is small, the electrified vehicle is charged by the alternating-current power. In this case, the charging device 20 may output the alternating-current power.

Therefore, when charging the normal electrified vehicle 6, the user turns the knob of the output switch 24 toward the direct-current side. FIG. 2 shows a state in which the knob of the output switch 24 is directed toward the direct-current side. On the other hand, when charging a small electrified vehicle, the user turns the knob of the output switch 24 toward the alternating-current side. As a result, the charging device 20 can charge the electrified vehicle to be charged regardless of whether the electric power for charging the electrified vehicle to be charged is the alternating-current power or the direct-current power. The details of the structure of the output switch 24 will be described later with reference to FIGS. 4 to 7.

Figure 3:
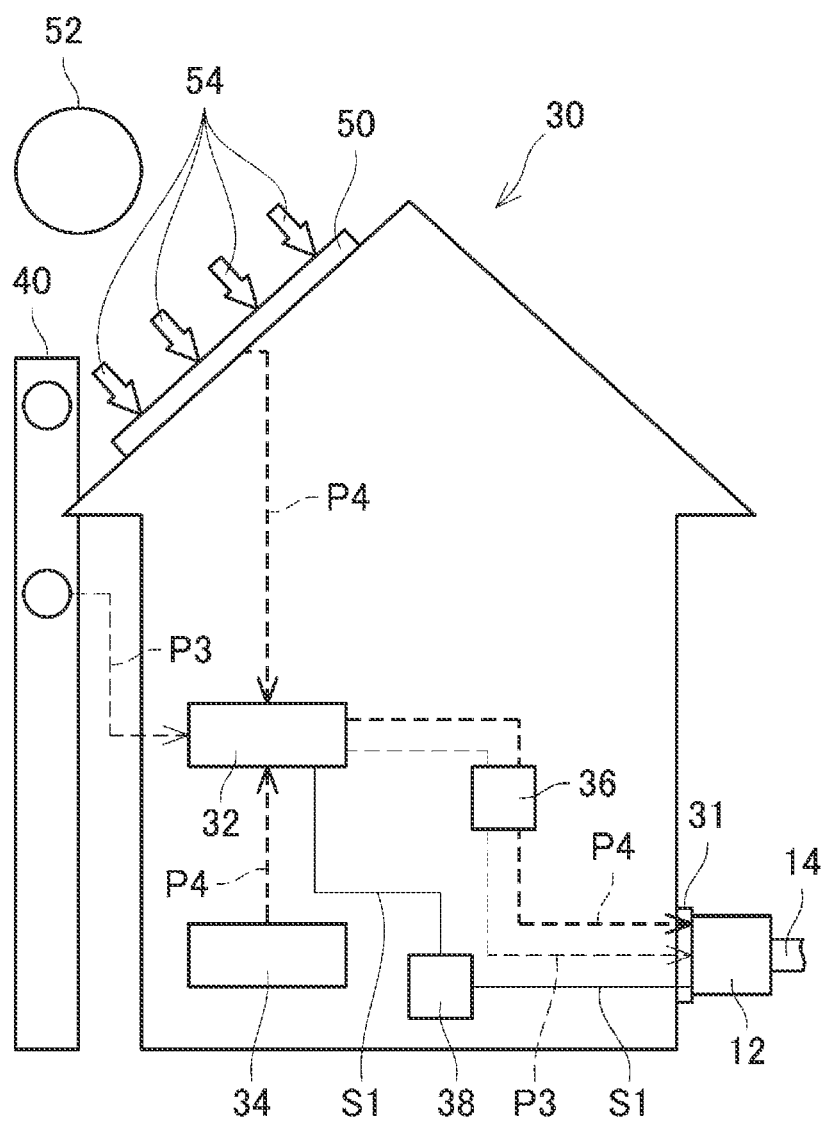
FIG. 3 shows a block diagram of a house 30.

The detailed structure of the house 30 will be described with reference to FIG. 3. The house 30 is a general house in which the user resides. The house 30 includes a solar panel 50. The solar panel 50 collects light 54 of the sun 52 and converts the energy into the direct-current power. Since the detailed structure of the solar panel 50 is known, the description thereof will be omitted.

The solar panel 50 supplies direct-current power P4 (hereinafter, may be referred to as individual power P4) converted from the light 54 to a power conditioner (PC) 32. The PC 32 controls the electric power in the house 30.

Further, in addition to the individual power P4 by the solar panel 50, alternating-current power P3 (hereinafter, may be referred to as system power P3) is supplied from a power plant (not shown) to the PC 34 of the house 30 via a utility pole 40.

The PC 32 operates a home appliance (not shown) in the house 30 by using the supplied individual power P4 and system power P3. When the amount of the individual power P4 supplied from the solar panel 50 is large during the daytime, the PC 32 converts the individual power P4 into the alternating-current power to operate the home appliances in the house 30. Further, the PC 32 stores the individual power P4 in a storage battery 34. Further, when the amount of the individual power P4 is small, such as at night, the PC 32 operates the home appliances in the house 30 by using the individual power P4 and the system power P3 stored in the storage battery 34. In FIG. 3, the individual power P4 is indicated by a thick dashed line arrow, and the system power P3 is indicated by a thin dashed line arrow.

The outlet 31 is provided on the outer wall of the house 30. The outlet 31 is a socket that fits into a CHAdeMO standard plug. The PC 32 supplies the individual power P4 or the system power P3 to the outlet 31 via a distribution board 36 in accordance with the power generation status of the solar panel 50 and the like. As a result, the individual power P4 (that is, the direct-current power) or the system power P3 (that is, the alternating-current power) is input to the input plug 12 connected to the outlet 31.

As mentioned earlier, the input plug 12 is a CHAdeMO standard. Therefore, the input plug 12 can perform controller area network (CAN) communication with a communication device 38 of the house 30. As a result, input information S1 indicating whether the PC 32 has supplied the individual power P4 or the system power P3 to the outlet 31 is supplied from the PC 32 to the input plug 12 via the communication device 38.

Conventionally, when the electrified vehicle 6 is charged by using the individual power P4 of the house 30, the PC 32 converts the individual power P4 into the alternating-current power and supplies it to the outlet 31. Thus, the charging device needs to convert the alternating-current power converted from the direct-current power generated by the solar panel 50 into the direct-current power again on the charger side and supply it to the electrified vehicle 6. Therefore, in the conventional technique, when the electrified vehicle 6 is charged in the house 30, the energy efficiency is lowered due to the loss generated during the power conversion.

As described above, in the house 30, the PC 32 supplies the individual power P4 (that is, the direct-current power) and the system power P3 (that is, the alternating-current power) to the outlet 31. This makes it possible to suppress a decrease in energy efficiency during power conversion.

However, when the house 30 supplies the direct-current power and the alternating-current power to the outlet 31, conventionally, the user needs to prepare and appropriately use a first charging device that accepts the direct-current power and charges the electrified vehicle 6 with the direct-current power, and a second charging device that accepts the alternating-current power above and charges the electrified vehicle 6 with the direct-current power, for example. In this case, since the convenience of the user deteriorates, the spread of the electrified vehicle 6 by the individual power P4 that can suppress the above-mentioned decrease in energy efficiency, is delayed.

Further, in order to improve user convenience, when a first input port capable of inputting the direct-current power and a second input port capable of inputting the alternating-current power are separately provided in one charging device, the size of the charging device is increased. As a result, the space for installing the expanded charging device is expanded, and the spread of the electrified vehicle 6 using the individual power P4 is delayed.

A relay circuit 70a included in the charging device 20 of the first embodiment will be described with reference to FIG. 4. The relay circuit 70a includes an input switch circuit 72, an output switch circuit 74, an input bypass circuit 75, an output bypass circuit 85, an input converter 76, a capacitor 78, an inverter 80, an isolation transformer 82, and an output converter 84.

The input port 26 includes a positive electrode input terminal 2'7p and a negative electrode input terminal 27n. Similarly, the output port 28 includes a positive electrode output terminal 29p and a negative electrode output terminal 29n. The relay circuit 70a is connected to each terminal 27p, 27n, 29p, 29n. That is, the relay circuit 70a relays electric power between the input port 26 and the output port 28.

The input switch circuit 72 includes an alternating-current input circuit 2A and a direct-current input circuit 2D. Each input circuit 2A, 2D has a pair of single-sided switches. The alternating-current input circuit 2A is located between the input terminals 2'7p and 27n and the input converter 76. The direct-current input circuit 2D is located between the input terminals 2'7p and 27n and the input bypass circuit 75.

The input switch circuit 72 is connected to the input switch 22. For example, when the amount of individual power P4 (see FIG. 3) generated by the solar panel 50 is reduced, such as at night, the user turns the knob of the input switch 22 toward the alternating-current side. In this case, the alternating-current input circuit 2A is turned on and the direct-current input circuit 2D is turned off. More specifically, when the knob of the input switch 22 is directed to the alternating-current side by the user, the pair of simple on-off switches of the alternating-current input circuit 2A connect the input terminals 2'7p and 27n to the input converter 76 (see broken line of alternating-current input circuit 2A in FIG. 4). In that case, the pair of simple on-off switches of the direct-current input circuit 2D disconnect the input terminals 2'7p and 27n from the input bypass circuit 75 (see the broken line of the direct-current input circuit 2D in FIG. 4).

When the electrified vehicle 6 is charged in this state, the alternating-current power (that is, the system power P3 in FIG. 3) is input to the input port 26 via the outlet 31 (see FIG. 2) of the house 30. Further, the alternating-current power is sent to the input converter 76 via the alternating-current input circuit 2A. The input converter 76 includes a switching element such as an insulated gate bipolar transistor (IGBT) or a metal-oxide-semiconductor field-effect transistor (MOSFET). By switching each switching element, the input converter 76 converts the alternating-current power into the direct-current power. In this specification, the details of converting the electric power by each device 76, 80, 84 will be omitted.

On the other hand, when the amount of power generated by the solar panel 50 is large, for example, in the daytime, the user turns the knob of the input switch 22 toward the direct-current side. In this case, the alternating-current input circuit 2A is turned off and the direct-current input circuit 2D is turned on. Specifically, the alternating-current input circuit 2A disconnects the input terminals 2'7p and 27n from the input converter 76, and the direct-current input circuit 2D connects the input terminals 2'7p and 27n to the input bypass circuit 75. As a result, when the direct-current power (that is, the individual power P4 in FIG. 3) is input to the input port 26 via the outlet 31, the direct-current power bypasses the input converter 76 via the direct-current input circuit 2D and the input bypass circuit 75.

As described above, in the relay circuit 70a of the charging device 20 of the first embodiment, the circuit to which each of the terminals 2'7p and 27n is connected can be changed by the input switch circuit 72 in accordance with whether the power input to the input port 26 is the direct-current power or the alternating-current power. As a result, both the direct-current power and the alternating-current power can be input to one charging device 20. Further, by arranging the input bypass circuit 75 and the input converter 76 in one relay circuit 70a, it is possible to suppress the expansion of the size. This promotes the widespread use of the charging device 20. As a result, the use of energy regenerated by the solar panel 50 is promoted, which can contribute to the realization of a carbon-free society.

The direct-current power converted by the input converter 76 or the direct-current power that bypasses the input converter 76 passes through the capacitor 78 and is applied to the inverter 80. The capacitor 78 is a so-called smoothing capacitor and suppresses the generation of pulsating current in the relay circuit 70a. The inverter 80 converts the direct-current power into the alternating-current power in order to input power to the isolation transformer 82. The isolation transformer 82 transmits electric power while insulating the house 30 side and the electrified vehicle 6 side. Although not shown, the isolation transformer 82 includes a primary coil on the input port 26 side, a secondary coil on the output port 28 side, and an iron core located between them. Each coil is electrically isolated. The electric power input to the primary coil generates a magnetic flux in the iron core, whereby the electric power is input to the secondary coil. As a result, even if a problem such as an electric leakage occurs on the electrified vehicle 6 side, it is possible to suppress the influence on the house 30 side and the system side.

As described above, the output switch circuit 74 is supplied with the alternating-current power converted by the inverter 80. Here, since the electrified vehicle 6 is charged by the direct-current power, it is necessary to convert the alternating-current power into the direct-current power by the output converter 84. On the other hand, for example, a small electrified vehicle is charged by the alternating-current power.

Figure 4:
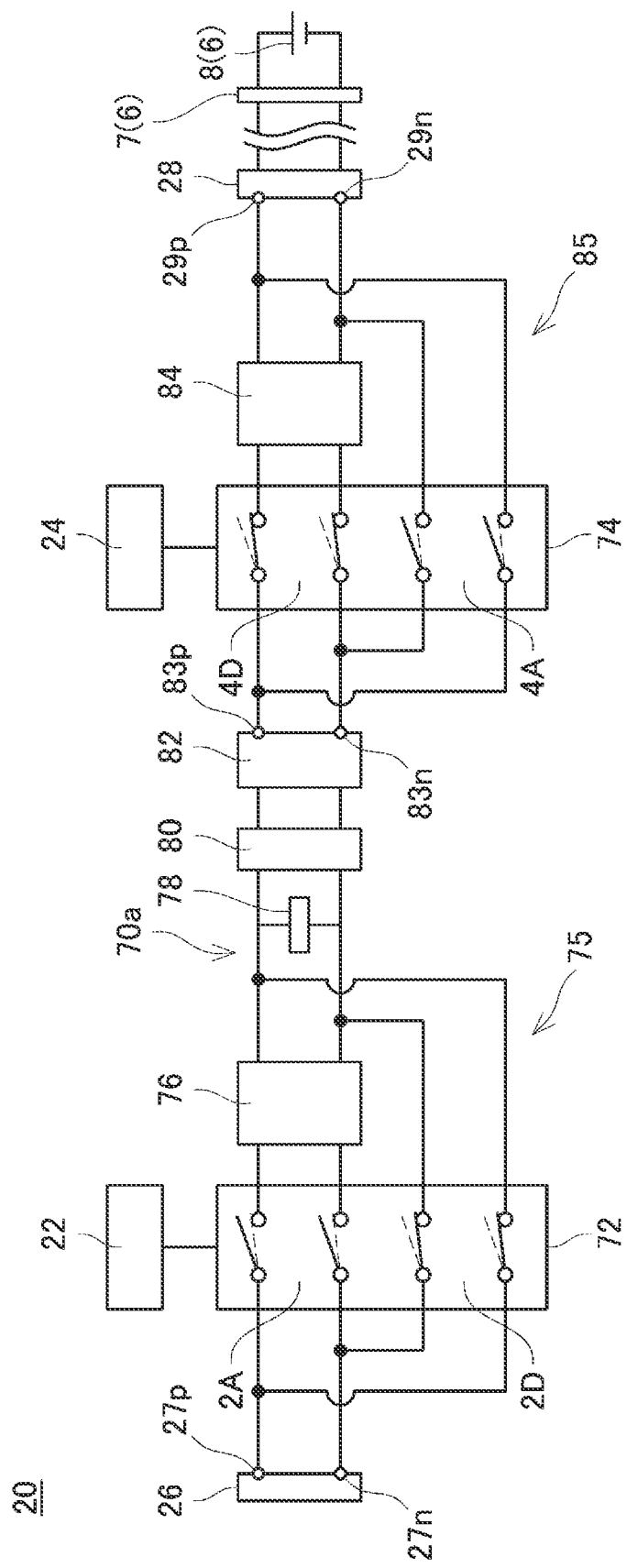
FIG. 4 shows a circuit diagram of a relay circuit 70a included in the charging device of a first embodiment.

As shown in FIG. 4, a positive electrode transformer terminal 83p and a negative electrode transformer terminal 83n of the isolation transformer 82 are connected to the output switch circuit 74. The output switch circuit 74 includes an alternating-current output circuit 4A and a direct-current output circuit 4D. Each output circuit 4A, 4D has a pair of simple on-off switches. The alternating-current output circuit 4A is located between the transformer terminals 83p and 83n and an output bypass circuit 85. The direct-current output circuit 4D is located between the transformer terminals 83p and 83n and the output converter 84.

The output switch circuit 74 is connected to the output switch 24. For example, when charging a small electrified vehicle, the user turns the knob of the output switch 24 toward the alternating-current side. In this case, the alternating-current output circuit 4A is turned on and the direct-current output circuit 4D is turned off. Specifically, when the knob of the output switch 24 is turned to the alternating-current side by the user, the pair of simple on-off switches of the alternating-current output circuit 4A connect the transformer terminals 83p and 83n to the output bypass circuit 85 (see the broken line of the alternating-current output circuit 4A in FIG. 4). In that case, the pair of simple on-off switches of the direct-current output circuit 4D do not connect the transformer terminals 83p and 83n to the output converter 84 (see the broken line of the direct-current output circuit 4D in FIG. 4).

As a result, the alternating-current power converted by the inverter 80 is applied to the output port 28 by bypassing the output converter 84. As a result, the alternating-current power converted by the inverter 80 is directly output to the battery of the small electrified vehicle.

On the other hand, for example, in the case of rapidly charging the electrified vehicle 6, the user turns the knob of the output switch 24 toward the direct-current side. In this case, the alternating-current output circuit 4A is turned off and the direct-current output circuit 4D is turned on. Specifically, when the knob of the output switch 24 is directed to the direct-current side by the user, the direct-current output circuit 4D connects the transformer terminals 83p and 83n to the output converter 84 (see the direct-current output circuit 4D in FIG. 4). In that case, the alternating-current output circuit 4A disconnects the transformer terminals 83p and 83n from the output bypass circuit 85 (see the solid line of the alternating-current output circuit 4A in FIG. 4). As a result, the alternating-current power is converted into the direct-current power by the output converter 84, and the direct-current power is output to the electrified vehicle 6.

As described above, in the relay circuit 70a of the charging device 20 of the first embodiment, the circuit to which each of the transformer terminals 83p and 83n is connected can be changed by the output switch circuit 74 in accordance with whether the power output to the electrified vehicle is the direct-current power or the alternating-current power. This makes it possible to suppress the expansion of the size of the charging device 20 even when the direct-current power and the alternating-current power are output.

Figure 5:
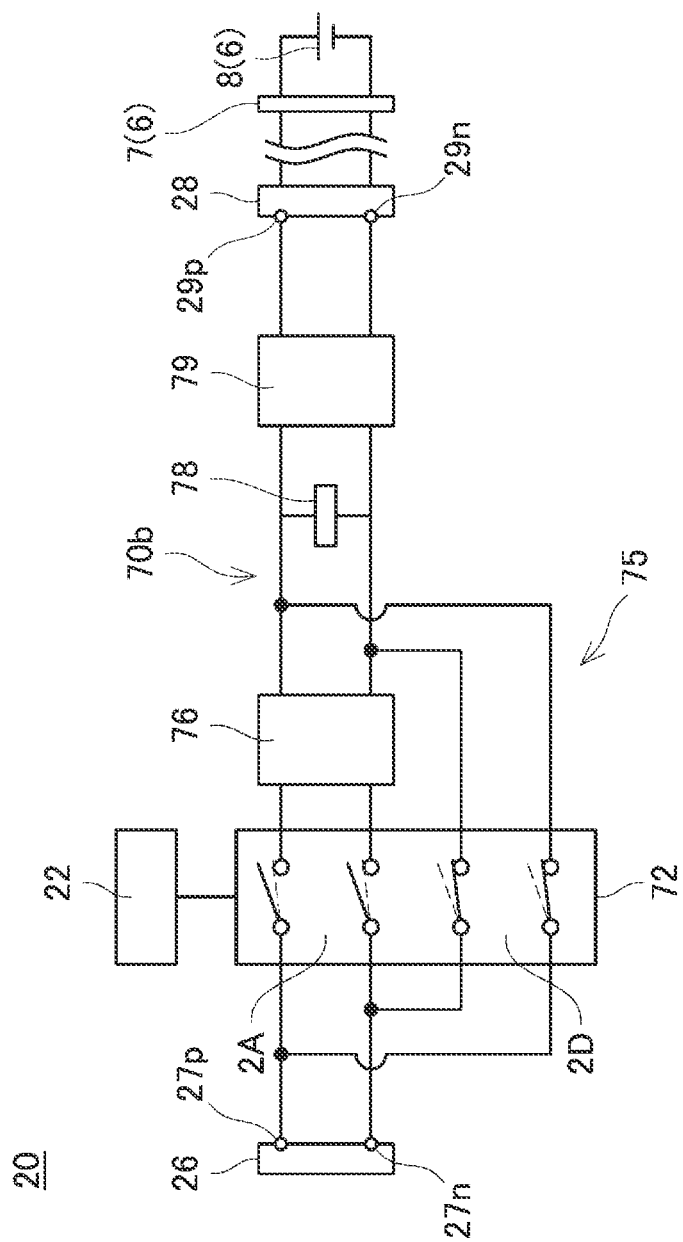
FIG. 5 shows a circuit diagram of a relay circuit 70b included in the charging device of a second embodiment.

A relay circuit 70b of the charging device 20 of the second embodiment will be described with reference to FIG. 5. The charging device 20 of the second embodiment does not include the output switch 24 (see FIG. 1). Thus, unlike the relay circuit 70a of the first embodiment, the relay circuit 70b of the second embodiment does not include the output switch circuit 74. Further, the relay circuit 70b of the second embodiment includes a boost converter 79 instead of the inverter 80, the isolation transformer 82, and the output converter 84 provided in the first embodiment. In other respects, the relay circuit 70b of the second embodiment has the same configuration as the relay circuit 70a of the first embodiment.

Similar to the relay circuit 70a of the first embodiment, in the relay circuit 70b of the second embodiment, with the input switch circuit 72, it is possible to change between connecting each of the input terminals 2'7p and 27n to the input converter 76 or connecting each of the input terminals 2'7p and 27n to the input bypass circuit 75. Thus, the charging device 20 of the second embodiment can suppress the expansion of the size even if the direct-current power and the alternating-current power are input. Further, the relay circuit 70b of the second embodiment boosts the direct-current power to a voltage suitable for the electrified vehicle 6, with the boost converter 79. In the modified example, the relay circuit 70b of the second embodiment does not have to include the boost converter 79.

Figure 6:
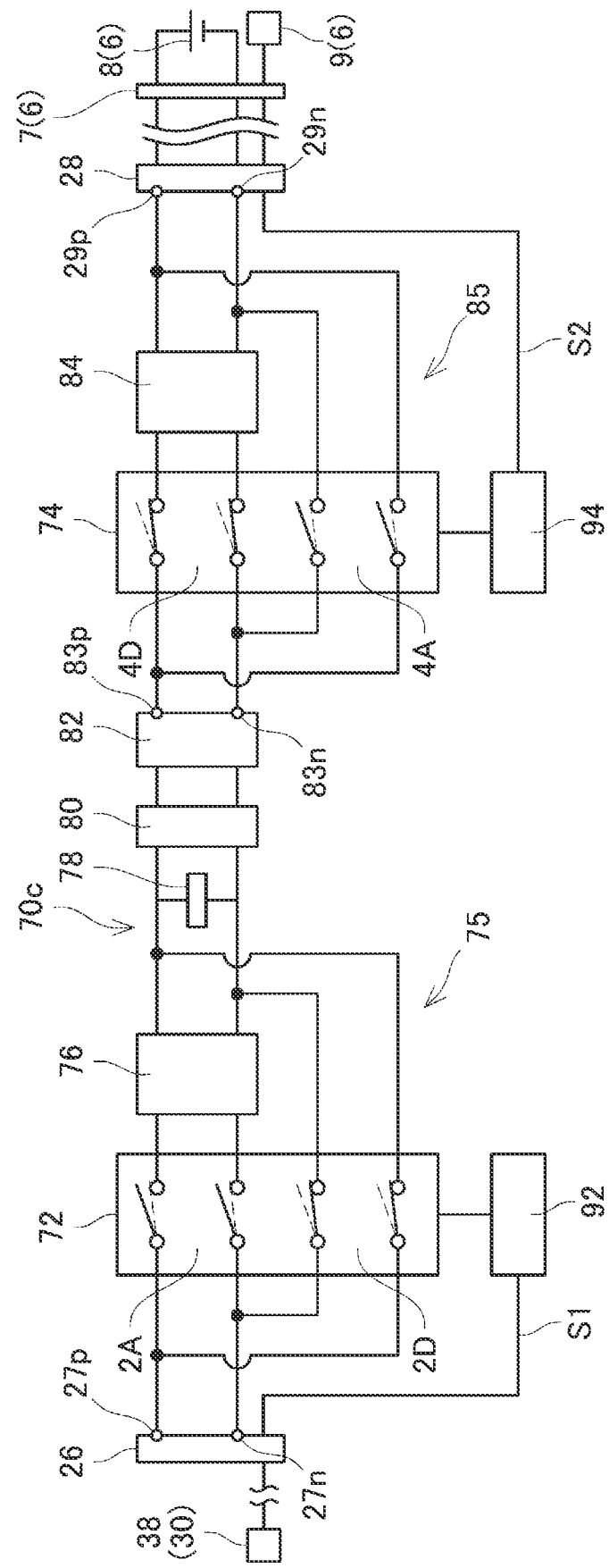
FIG. 6 shows a circuit diagram of a relay circuit 70c included in the charging device of a third embodiment.

A relay circuit 70c of the charging device 20 of the third embodiment will be described with reference to FIG. 6. The above-described charging device 20 of the third embodiment does not include the input switch 22 and the output switch 24. The relay circuit 70c of the third embodiment includes an input information receiving unit 92 instead of the input switch 22, and an output information receiving unit 94 instead of the output switch 24. In other respects, the relay circuit 70c of the third embodiment has the same configuration as the relay circuit 70a of the first embodiment.

The input information receiving unit 92 is connected to the input switch circuit 72. Further, the input information receiving unit 92 is connected to the communication device 38 of the house 30 via the input port 26 and the input plug 12 (see FIG. 1). As mentioned above, the input plug 12 is CHAdeMO standard and can execute CAN communication with the communication device 38 of the house 30. Thus, the input information receiving unit 92 can receive input information S1 from the communication device 38 of the house 30 by using CAN communication. As described above, in the charging device 20 of the third embodiment, by connecting the house 30 and the input port 26 via the CHAdeMO standard input plug 12, CAN communication can be performed between the communication device 38 and the relay circuit 70c with a relatively simple structure.

When the input information receiving unit 92 receives the input information S1 indicating that the individual power P4 (that is, the direct-current power) has been supplied to the outlet 31 from the PC 32 (see FIG. 3) of the house 30, the alternating-current input circuit 2A is turned off and the direct-current input circuit 2D is turned on. On the other hand, when the input information receiving unit 92 receives the input information S1 indicating that the system power P3 has been supplied from the PC 32 to the outlet 31, the alternating-current input circuit 2A is turned on and the direct-current input circuit 2D is turned off. As described above, in the relay circuit 70c of the third embodiment, each of the input circuits 2A and 2D of the input switch circuit 72 is switched on and off, based on the input information S1 indicating whether the power supplied from the PC 32 is the direct-current power or the alternating-current power. Thus, as compared with the configuration in which the user operates the input switch 22, the on/off of each of the input circuits 2A and 2D of the input switch circuit 72 can be reliably switched.

As mentioned earlier, the output plug 2 is CHAdeMO standard. Thus, the output information receiving unit 94 can execute CAN communication with the transmitting device 9 of the electrified vehicle 6 via the output port 28 and the output plug 2. The output information receiving unit 94 can receive the output information S2 from the transmitting device 9 of the electrified vehicle 6 by using CAN communication. When the output information receiving unit 94 receives the output information S2 indicating that the electrified vehicle 6 is charged with the direct-current power from the transmitting device 9 of the electrified vehicle 6, the alternating-current output circuit 4A is turned off and the direct-current output circuit 4D is turned on. On the other hand, when the output information receiving unit 94 receives the output information S2 indicating that the electrified vehicle 6 is charged with the alternating-current power from the transmitting device 9, the alternating-current output circuit 4A is turned on and the direct-current output circuit 4D is turned off. As described above, in the relay circuit 70c of the third embodiment, each of the circuits 4A and 4D of the output switch circuit 74 is switched, based on the output information S2 indicating whether the output that can be output to the charging target is the direct-current power or the alternating-current power. Thus, as compared with the configuration in which the user operates the output switch 24, each of the on/off of the circuits 4A and 4D of the output switch circuit 74 can be reliably switched.

Figure 7:
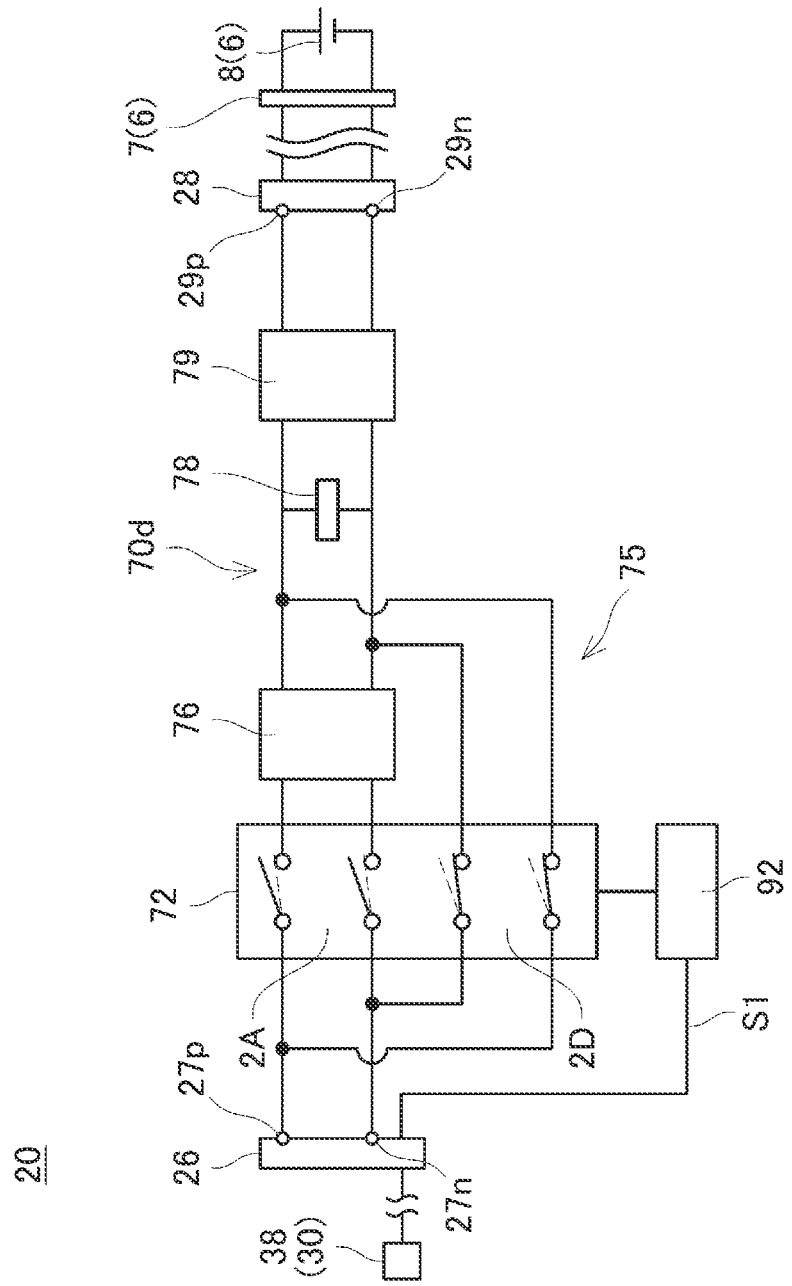
FIG. 7 shows a circuit diagram of a relay circuit 70d included in the charging device of a fourth embodiment.

A relay circuit 70d of the charging device 20 of the fourth embodiment will be described with reference to FIG. 7. In the relay circuit 70d of the fourth embodiment, the input information receiving unit 92 is provided instead of the input switch 22 of the relay circuit 70b of the second embodiment. As described above, the input information receiving unit 92 can switch on/off each of the input circuits 2A and 2D of the input switch circuit 72 based on the input information S1. Thus, as compared with the configuration in which the user operates the input switch 22, the on/off of each of the input circuits 2A and 2D of the input switch circuit 72 can be reliably switched.

Although the specific examples disclosed by the present disclosure have been described in detail above, these are merely examples and do not limit the scope of claims. The techniques described in the claims include various modifications and alternations of the specific example illustrated above. Modifications of the above-described embodiment are listed below.

FIRST MODIFICATION

The inverter 80 and the isolation transformer 82 can be omitted. In that case, the relay circuits 70a and 70c include an output inverter instead of the output converter 84. In this modification, when the alternating-current power is output to the electrified vehicle 6, the output inverter is connected to the upstream side by the direct-current output circuit 4D of the output switch circuit 74. On the other hand, when the direct-current power is output to the electrified vehicle 6, the output bypass circuit 85 is connected to the upstream side by the alternating-current output circuit 4A of the output switch circuit 74.

SECOND MODIFICATION

The input switch 22 and the input information receiving unit 92 can be omitted. In that case, for example, the on/off of each of the input circuits 2A and 2D of the input switch circuit 72 may be switched in accordance with the time zone.

THIRD MODIFICATION

The input plug 12 may have a structure having a standard different from that of the CHAdeMO standard. Further, for the input cable 10 and the output cable 11, cables different from each other may be used. In particular, the output cable 11 may have different cables connected to the charging device 20 depending on whether the electrified vehicle is charged with the direct-current power or the electrified vehicle is charged with the alternating-current power.

FOURTH MODIFICATION

The charging device 20 does not have to be portable. For example, it may be a charging device embedded in the house 30.

FIFTH MODIFICATION

In the above-described embodiment, the characters "IN" are marked on the input plug 12, and the characters "OUT" are marked on the output plug 2, thereby distinguishing the two. That is, in the embodiment, these characters are an example of "features". In this modification, instead of this, each of the plugs 12 and 2 may have different colors. In that case, the color of each of the plugs 12 and 2 is an example of the "features". Further, instead of the characters, a mark for identifying each of the plugs 12 and 2 may be added. In this case, the mark is an example of the "features". Further, these features may be applied to each of the cable main bodies 14 and 4 instead of each of the plugs 12 and 2, or may be attached to each of the ports 26, 28. The "features" referred to here is not limited to what is visible, and may be something that can be identified by other senses such as tactile sensation (for example, "Braille").

SIXTH MODIFICATION

In the embodiments described above, each of the ports 26 and 28 are provided on opposite surfaces of the housing, respectively. In this modification, instead of this, each of the ports 26 and 28 may be arranged adjacent to each other on the same surface of the housing of the charging device 20. As a result, the user can easily access each of each of the ports 26 and 28.

The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A charging device comprising:
an input port that is electrically connected to an external power source provided externally and that is configured to be able to input direct-current power and alternating-current power from the external power source;
an output port that is electrically connected to an electrified vehicle and that outputs direct-current power to the electrified vehicle; and
a relay circuit that relays power between the input port and the output port,
wherein the relay circuit includes:
 a converter circuit that converts alternating-current power into direct-current power when the alternating-current power is input to the input port,
 an input bypass circuit that causes direct-current power to bypass the converter circuit when the direct-current power is input to the input port, and a first input switch that switches between the converter circuit and the input bypass circuit, and
wherein the first input switch is configured to be able to be switched by a user.

2. The charging device according to claim 1,
wherein the relay circuit further includes:
a second input switch that switches between the converter circuit and the input bypass circuit, and
an input information receiving unit that receives, from the external power source, input information indicating whether power input from the external power source to the input port is direct-current power or alternating-current power, and
wherein the second input switch switches between the converter circuit and the input bypass circuit based on the input information received by the input information receiving unit.

3. The charging device according to claim 2, wherein a CHAdeMO (registered trademark) standard plug is connected to the input port.

4. The charging device according to claim 1,
wherein the output port is configured to be able to also output alternating-current power to the electrified vehicle, and
wherein the relay circuit further includes:
an inverter circuit that converts direct-current power into alternating-current power when the alternating-current power is output to the electrified vehicle, and
an output bypass circuit that causes direct-current power to bypass the inverter circuit when the direct-current power is output to the electrified vehicle.

5. The charging device according to claim 4,
wherein the relay circuit further includes a first output switch that switches between the inverter circuit and the output bypass circuit, and
wherein the first output switch is configured to be able to be switched by the user.

6. The charging device according to claim 4,
wherein the relay circuit further includes:
a second output switch that switches between the inverter circuit and the output bypass circuit, and
an output information receiving unit that receives output information indicating whether power that is able to be output to the electrified vehicle is direct-current power or alternating-current power, and
wherein the second output switch switches between the inverter circuit and the output bypass circuit based on the output information received by the output information receiving unit.

7. The charging device according to claim 1,
wherein the input port is configured to be able to be removed from the external power source, and
wherein the charging device is configured to be able to be carried.

8. The charging device according to claim 1,
wherein an input plug is connected to the input port,
wherein an output plug is connected to the output port, and
wherein a feature for distinguishing between the input plug and the output plug is provided.

9. The charging device according to claim 1, further comprising a housing that houses the relay circuit,
wherein the input port and the output port are provided on the same surface of the housing or are provided on surfaces located opposite to each other.

10. A charging device comprising:
an input port that is electrically connected to an external power source provided externally and that is configured to be able to input direct-current power and alternating-current power from the external power source;
an output port that is electrically connected to an electrified vehicle and that outputs direct-current power to the electrified vehicle, the output port is configured to be able to also output alternating-current power to the electrified vehicle; and
a relay circuit that relays power between the input port and the output port, wherein the relay circuit includes:
a converter circuit that converts alternating-current power into direct-current power when the alternating-current power is input to the input port,
an input bypass circuit that causes direct-current power to bypass the converter circuit when the direct-current power is input to the input port,
an inverter circuit that converts direct-current power into alternating-current power when the alternating-current power is output to the electrified vehicle, and
an output bypass circuit that causes direct-current power to bypass the inverter circuit when the direct-current power is output to the electrified vehicle.

11. The charging device according to claim 10, wherein the relay circuit further includes a first output switch that switches between the inverter circuit and the output bypass circuit, and
wherein the first output switch is configured to be able to be switched by a user.

12. The charging device according to claim 10, wherein the relay circuit further includes:
a second output switch that switches between the inverter circuit and the output bypass circuit, and
an output information receiving unit that receives output information indicating whether power that is able to be output to the electrified vehicle is direct-current power or alternating-current power, and
wherein the second output switch switches between the inverter circuit and the output bypass circuit based on the output information received by the output information receiving unit.

13. A charging device comprising:
an input port that is electrically connected to an external power source provided externally and that is configured to be able to input direct-current power and alternating-current power from the external power source;
an output port that is electrically connected to an electrified vehicle and that outputs direct-current power to the electrified vehicle; and
a relay circuit that relays power between the input port and the output port,
wherein the relay circuit includes:
a converter circuit that converts alternating-current power into direct-current power when the alternating-current power is input to the input port,
an input bypass circuit that causes direct-current power to bypass the converter circuit when the direct-current power is input to the input port, and
a second input switch that switches between the converter circuit and the input bypass circuit, and
an input information receiving unit that receives, from the external power source, input information indicating whether power input from the external power source to the input port is direct-current power or alternating-current power, and wherein the second input switch switches between the converter circuit and the input bypass circuit based on the input information received by the input information receiving unit.

14. The charging device according to claim 13, wherein a CHAdeMO (registered trademark) standard plug is connected to the input port.

* * * * *